United States Patent
Terry et al.

(10) Patent No.: US 8,351,371 B2
(45) Date of Patent: Jan. 8, 2013

(54) METHOD AND APPARATUS FOR MINIMIZING REDUNDANT ENHANCED UPLINK ALLOCATION REQUESTS AND FAULT-ISOLATING ENHANCED UPLINK TRANSMISSION FAILURES

(75) Inventors: Stephen E. Terry, Northport, NY (US); Guodong Zhang, Farmingdale, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1284 days.

(21) Appl. No.: 11/114,390

(22) Filed: Apr. 26, 2005

(65) Prior Publication Data

US 2005/0243761 A1  Nov. 3, 2005

Related U.S. Application Data

(60) Provisional application No. 60/567,144, filed on Apr. 30, 2004.

(51) Int. Cl.
   *H04W 4/00* (2009.01)
(52) U.S. Cl. ..... 370/328; 455/450; 455/451; 455/452.1; 455/452.2; 455/464; 455/509; 455/510; 455/512; 455/513; 455/436; 455/437; 455/440; 370/329; 370/331; 370/332; 370/335
(58) Field of Classification Search .................. 370/329, 370/331, 332, 335; 455/450, 451, 452.1, 455/452.2, 464, 509, 510, 512, 513
See application file for complete search history.

(56) References Cited

U.S. PATENT DOCUMENTS 5,301,356 A * 4/1994 Bodin et al. .................. 455/436
5,355,516 A * 10/1994 Herold et al. ................. 455/510
(Continued)

FOREIGN PATENT DOCUMENTS

JP  11-146462  5/1999
(Continued)

OTHER PUBLICATIONS $3^{rd}$ Generation Partnership Project; Technical Specification Group Radio Access Network; FDD Enhanced Uplink; Overall Decription; Stage 2 (Release 6), 3GPP TS 25.309 V6.2.0 (Mar. 2005).

(Continued)

*Primary Examiner* — Patrick Edouard
*Assistant Examiner* — Shantell Heiber
(74) *Attorney, Agent, or Firm* — Volpe and Koenig, P.C.

(57) ABSTRACT

A method and apparatus for minimizing redundant enhanced uplink (EU) allocation requests and fault-isolating EU transmission failures that occur between a wireless transmit/receive unit (WTRU) and a Node-B. The WTRU transmits an enhanced dedicated channel (E-DCH) allocation request to the Node-B over an uplink (UL) EU channel. In one embodiment, if E-DCH allocation cannot be provided within a predetermined time period, the Node-B sends an acknowledgement message to the WTRU via a downlink (DL) EU signaling channel without sending E-DCH allocation information. The request is queued in the Node-B and the WTRU refrains from transmitting the same request until after the time period expires or resources become available. In another embodiment, appropriate actions are taken to correct EU transmission failures by determining whether an E-DCH allocation request was unsuccessfully delivered via the UL EU channel or whether channel allocation information was unsuccessfully delivered via the DL EU signaling channel.

6 Claims, 2 Drawing Sheets

U.S. PATENT DOCUMENTS

| | | | |
|---|---|---|---|
| 5,513,183 | A | 4/1996 | Kay et al. |
| 5,517,679 | A * | 5/1996 | Yahagi .......................... 340/7.38 |
| 5,729,542 | A | 3/1998 | Dupont |
| 5,754,537 | A | 5/1998 | Jamal |
| 5,818,845 | A | 10/1998 | Moura et al. |
| 6,335,922 | B1 | 1/2002 | Tiedemann, Jr. et al. |
| 6,404,756 | B1 | 6/2002 | Whitehill et al. |
| 6,597,920 | B2 | 7/2003 | Yegani et al. |
| 6,842,437 | B1 * | 1/2005 | Heath ........................... 370/322 |
| 2003/0078059 | A1 | 4/2003 | Hamiti et al. |
| 2003/0125036 | A1 | 7/2003 | Kondo |
| 2004/0063455 | A1 | 4/2004 | Eran et al. |
| 2004/0110512 | A1 * | 6/2004 | Lim ............................... 455/450 |
| 2004/0127226 | A1 * | 7/2004 | Dugad et al. .................. 455/450 |
| 2004/0156399 | A1 * | 8/2004 | Eran .............................. 370/913 |
| 2004/0190486 | A1 * | 9/2004 | Oshiba .......................... 370/349 |
| 2005/0020272 | A1 * | 1/2005 | Barve ............................ 455/450 |
| 2005/0025100 | A1 * | 2/2005 | Lee et al. ...................... 370/335 |
| 2005/0176430 | A1 | 8/2005 | Lee et al. |
| 2006/0023629 | A1 | 2/2006 | Kim et al. |

FOREIGN PATENT DOCUMENTS

| | | |
|---|---|---|
| KR | 2001-0111637 | 12/2001 |
| WO | 00/11879 | 3/2000 |
| WO | 2005/004667 | 10/2005 |
| WO | 2005/104667 | 11/2005 |

OTHER PUBLICATIONS

3GPP, 3$^{rd}$ Generation Partnership Project; Technical Specification Group Radio Access Network; Medium Access Control (MAC) Protocol Specification (Release 5), 3GPP TS 25.321 V5.8.0 (Mar. 2004.

3GPP2 C.S0002-C, "Physical Layer Standard for cdma2000 Spread Spectrum Systems", 3$^{rd}$ Generation Partnership Project 2 "3GPP2", Version 2.0, Release C, Jul. 23, 2004.

3GPP, 3$^{rd}$ Generation Partnership Project; Technical Specification Group Radio Access Network; Medium Access Control (MAC) Protocol Specification (Release 5), 3GPP TS 25.321 V.10.0 (Dec. 2004).

3GPP, 3$^{rd}$ Generation Partnership Project; Technical Specification Group Radio Access Network; Medium Access Control (MAC) Protocol Specification (Release 4). 3GPP TS 25.321 V4.10.0 (Jun. 2004).

3GPP, 3$^{rd}$ Generation Partnership Project; Technical Specification Group Radio Access Network; High Speed Downlink Packet Access (HSDPA); Overall Description; Stage 2 (Release 5). 3GPP TS 25.308 V5.7.0 (Dec. 2004).

3GPP2 C.S0004-C, "Signaling Link Access Control (LAC) Standard for cdma2000 Spread Spectrum Systems", 3$^{rd}$ Generation Project 2 "3GPP2", Version 2.0, Revision C, Jul. 23, 2004.

3GPP, "3$^{rd}$ Generation Partnership Project; Technical Specification Group Radio Access Network; Physical channels and mapping of transport channels onto physical channels (FDD) (Release 6)," 3GPP TS 25.211 V6.4.0 (Mar. 2005).

3GPP, "3$^{rd}$ Generation Partnership Project; Technical Specification Group Radio Access Network; Physical channels and mapping of transport channels onto physical channels (FDD) (Release 5)," 3GPP TS 25.211 V5.5.0 (Sep. 2003).

3GPP, "3$^{rd}$ Generation Partnership Project; Technical Specification Group Radio Access Network; Physical channels and mapping of transport channels onto physical channels (FDD) (Release 5)," 3GPP TS 25.211 V5.6.0 (Sep. 2004).

3GPP, "3$^{rd}$ Generation Partnership Project; Technical Specification Group Radio Access Network; Physical channels and mapping of transport channels onto physical channels (FDD) (Release 6)," 3GPP TS 25.211 V6.0.0 (Dec. 2003).

3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.

3$^{rd}$ Generation Partnership Project; Technical Specification Group Radio Access Network; High Speed Downlink Packet Access (HSDPA); Overall Description; Stage 2 (Release 6), 3GPP TS 25.308 V6.1.0 (Mar. 2003).

3GPP, 3$^{rd}$ Generation Partnership Project; Technical Specification Group Radio Access Network; Medium Access Control (MAC) Protocol Specification (Release 5), 3GPP TS 25.321 V5.10.0 (Dec. 2004).

3GPP, 3$^{rd}$ Generation Partnership Project; Technical Specification Group Radio Access Network; Medium Access Control (MAC) Protocol Specification (Release 5), 3GPP TS 25.321 V5.8.0 (Mar. 2004).

3GPP, 3$^{rd}$ Generation Partnership Project; Technical Specification Group Radio Access Network; Medium Access Control (MAC) Protocol Specification (Release 4), 3GPP TS 25.321 V4.10.0 (Jun. 2004).

3GPP, 3$^{rd}$ Generation Partnership Project; Technical Specification Group Radio Access Network; Medium Access Control (MAC) Protocol Specification (Release 4), 3GPP TS 25.321 V4.9.0 (Mar. 2003).

3GPP, 3$^{rd}$ Generation Partnership Project; Technical Specification Group Radio Access Network; Medium Access Control (MAC) Protocol Specification (Release 1999), 3GPP TS 25.321 V3.17.0 (Jun. 2004).

3GPP, 3$^{rd}$ Generation Partnership Project; Technical Specification Group Radio Access Network; Medium Access Control (MAC) Protocol Specification (Release 1999), 3GPP TS 25.321 V3.16.0 (Sep. 2003).

3GPP, 3$^{rd}$ Generation Partnership Project; Technical Specification Group Radio Access Network; High Speed Downlink Packet Access (HSDPA); Overall Description; Stage 2 (Release 5), 3GPP TS 25.308 V5.5.0 (Mar. 2004).

3GPP, 3$^{rd}$ Generation Partnership Project; Technical Specification Group Radio Access Network; High Speed Downlink Packet Access (HSDPA); Overall Description; Stage 2 (Release 5), 3GPP TS 25.308 V5.7.0 (Dec. 2004).

3GPP, "3rd Generation Partnership Project; Technical Specification Group Radio Access Network; Physical channels and mapping of transport channels onto physical channels (FDD) (Release 6)," 3GPP TS 25.211 V6.4.0 (Mar. 2005).

3GPP, "3rd Generation Partnership Project; Technical Specification Group Radio Access Network; Physical channels and mapping of transport channels onto physical channels (FDD) (Release 5)," 3GPP TS 25.211 V5.5.0 (Sep. 2003).

3GPP, "3rd Generation Partnership Project; Technical Specification Group Radio Access Network; Physical channels and mapping of transport channels onto physical channels (FDD) (Release 5)," 3GPP TS 25.211 V5.6.0 (Sep. 2004).

3GPP, "3rd Generation Partnership Project; Technical Specification Group Radio Access Network; Physical channels and mapping of transport channels onto physical channels (FDD) (Release 6),"3GPP TS 25.211 V6.0.0 (Dec. 2003).

3GPP2 C.20003-C, "Medium Access Control (MAC) Standard for cdma2000 Spread Spectrum Systems", 3$^{rd}$ Generation Parnership Project 2 "3GPP2", Version 2.0, Release C, Aug. 2004.

3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.

3GPP2 C.S0004-C, "Signaling Link Access Control (LAC) Standard for cdma2000 Spread Spectrum Systems", 3$^{rd}$ Generation Parnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Parnership Project 2 "3GPP2", Version 2.0, Revision c, Jul. 23, 2004.

3$^{rd}$ Generation Partnership Project; Technical Specification Group Radio Access Network; FDD Enhanced Uplink; Overall Description; Stage 2 (Release 6), 3GPP TS 25.309 V6.2.0 (Mar. 2005).

3$^{rd}$ Generation Partnership Project; Technical Specification Group Radio Access Network; High Speed Downlink Packet Access (HSDPA); Overall Description; Stage 2 (Release 6), 3GPP TS 25.308 V6.3.0 (Dec. 2004).

3rd Generation Partnership Project; Technical Specification Group Radio Access Network; High Speed Downlink Packet Access (HSDPA); Overall Description; Stage 2 (Release 6), 3GPP TS 25.308 V6.1.0 (Mar. 2004).

3rd Generation Partnership Project; Technical Specification Group Radio Access Network; Medium Access Control (MAC) Protocol Specification (Release 6), 3GPP TS 25.321 V6.4.0 (Mar. 2005).

3rd Generation Partnership Project; Technical Specification Group Radio Access Network; Medium Access Control (MAC) Protocol Specification (Release 6), 3GPP TS 25.321 V6.1.0 (Mar. 2004).

3rd Generation Partnership Project; Technical Specification Group Radio Access Network; Feasibility Study For Enhanced Uplink For UTRA FDD (Release 6), 3GPP TR25.896 V6.0.0 (Mar. 2004).

Chang, "Performance of a Mobile Data Communication System," IEEE Transactions on Vehicular Technology, vol. 40, Issue 1, pp. 161-169 (Feb. 1991).

* cited by examiner

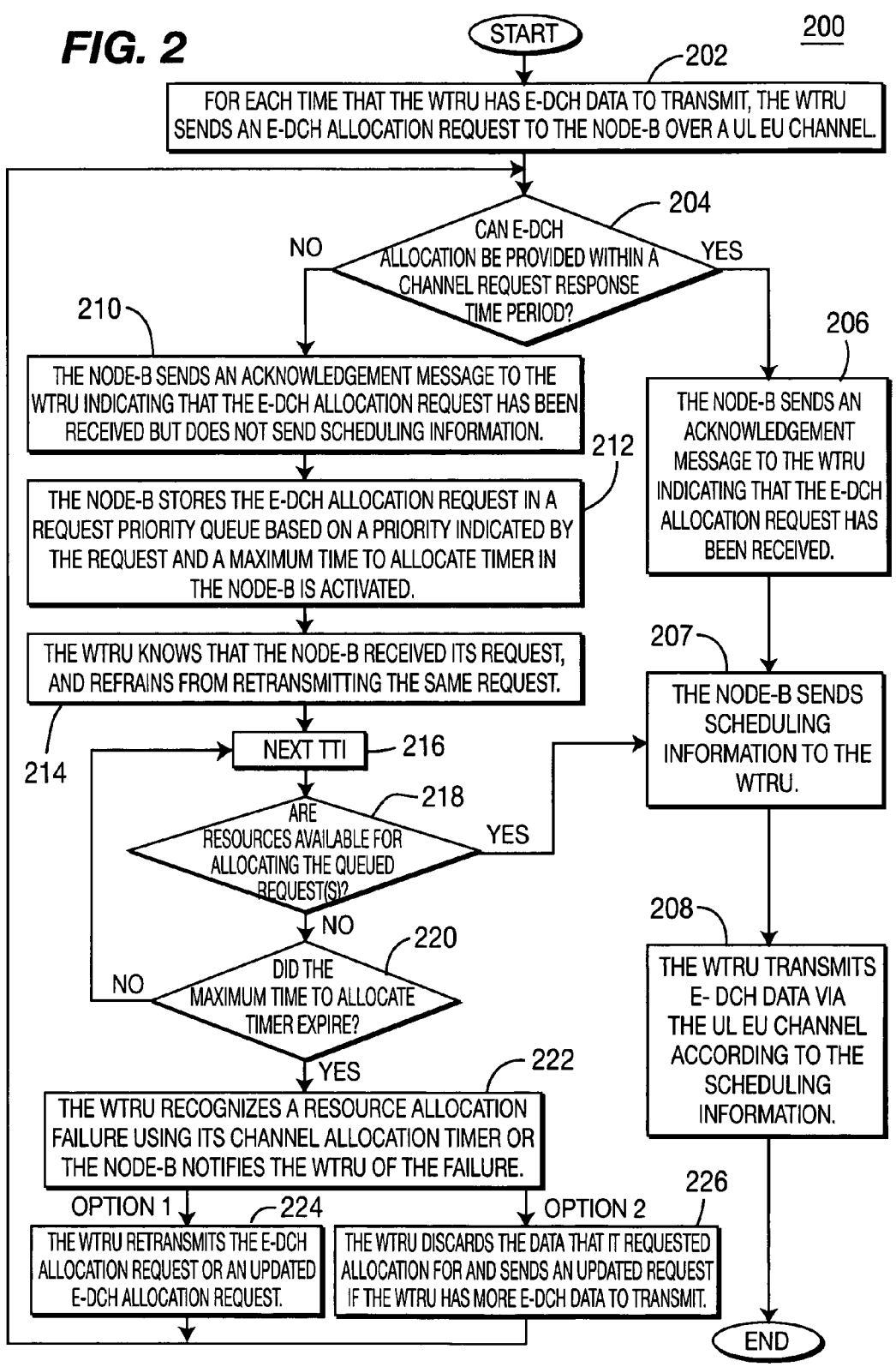

METHOD AND APPARATUS FOR MINIMIZING REDUNDANT ENHANCED UPLINK ALLOCATION REQUESTS AND FAULT-ISOLATING ENHANCED UPLINK TRANSMISSION FAILURES

CROSS REFERENCE TO RELATED APPLICATION

This application claims the benefit of U.S. Provisional Application No. 60/567,144 filed Apr. 30, 2004, which is incorporated by reference as if fully set forth.

FIELD OF INVENTION

The present invention is related to a wireless communication system including a wireless transmit/receive unit (WTRU), at least one Node-B and a radio network controller (RNC). More particularly, the present invention is a method and apparatus for minimizing redundant enhanced uplink (EU) allocation requests and fault-isolating EU transmission failures.

BACKGROUND

Methods for improving uplink (UL) coverage, throughput and transmission latency are being investigated in Release 6 (R6) of the 3rd Generation Partnership Project (3GPP). In order to successfully implement these methods, the scheduling and assigning of UL radio resources have been moved from a radio network controller (RNC) to a Node-B such that the Node-B can make decisions and manage UL radio resources on a short-term basis more efficiently than the RNC, even if the RNC retains overall control over the Node-B.

In order for the WTRU to transmit on enhanced dedicated channel (E-DCH), the WTRU must identify the need for E-DCH transmissions by transmitting E-DCH channel allocation requests to the Node-B. Then, the Node-B provides allocation of E-DCH physical resources to the WTRU that have requested the E-DCH channel.

When there are not enough UL resources for the E-DCH channel allocation requests, the Node-B cannot immediately allocate resources of E-DCH transmission for all WTRUs that have requested the E-DCH. If the WTRU does not receive an E-DCH allocation within a predetermined time period, the WTRU may retransmit the request until the WTRU receives E-DCH channel allocation information.

Since the transmission of an E-DCH channel allocation request interferes with other WTRUs, when each WTRU transmits and retransmits the same channel allocation request multiple times, the UL EU channel will increase UL interference. Thus, the overall efficiency of the system will be degraded.

Therefore, there is a need to minimize utilization of the UL signaling channel while maintaining proper EU scheduling operation. Furthermore, a procedure for fault-isolating EU transmission failures is desired.

SUMMARY

The present invention is a method and apparatus for minimizing redundant EU allocation requests and fault-isolating EU transmission failures that occur between a WTRU and a Node-B. The WTRU transmits an enhanced dedicated channel (E-DCH) allocation request to the Node-B over a UL EU channel when the WTRU has scheduled E-DCH data to transmit.

In one embodiment, the Node-B receives the channel allocation request and determines whether channel allocation can be provided for the WTRU within a predetermined channel request response time period. If channel allocation for the WTRU can be provided within the predetermined channel request response time period, the Node-B sends scheduling information, (i.e., E-DCH channel allocation information), to the WTRU. Otherwise, the Node-B only sends an acknowledgment message to the WTRU indicating that the channel allocation request has been received without sending a channel allocation. In response to the acknowledgement message, the WTRU refrains from transmitting the same channel allocation request for a predetermined maximum time to allocate period and the request is queued in the Node-B. If the maximum time to allocate period expires without receiving a channel allocation, the WTRU retransmits the channel allocation request.

In another embodiment, appropriate actions are taken to correct EU transmission failures by determining whether an E-DCH allocation request was unsuccessfully delivered via the UL EU channel or whether channel allocation information was unsuccessfully delivered via the DL EU signaling channel.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 2 is a flow diagram of a process for reducing congestion in a UL EU channel established in the system of FIG. 1 in accordance with one embodiment of the present invention.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
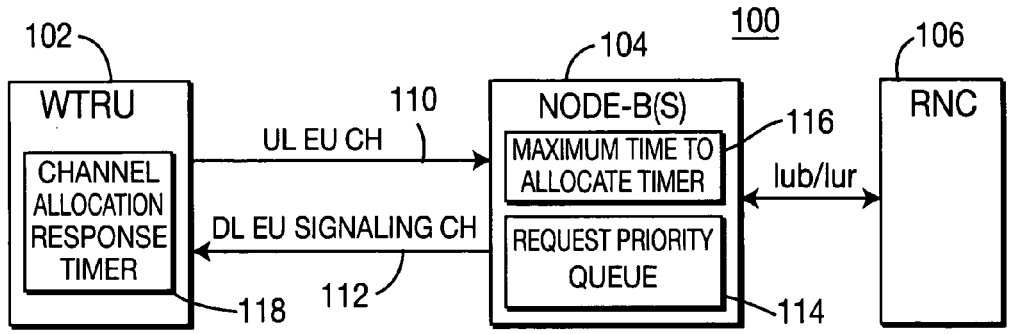
FIG. 1 is a block diagram of a wireless communication system in accordance with the present invention.

FIG. 1 is a block diagram of a wireless communication system 100 in accordance with the present invention. The system 100 includes a WTRU 102, one or more Node-Bs 104 and an RNC 106. The RNC 106 controls overall EU operation by configuring EU parameters for the Node-B 104 and the WTRU 102, such as maximum allowed EU transmit power or available channel resources per Node-B. The WTRU 102 sends a channel allocation request to the Node-B 104 via a UL EU channel 110 and the Node-B 104 sends channel allocation information via one or more downlink (DL) EU signaling channels 112. After EU radio resources are allocated for the WTRU 102, the WTRU 102 transmits data via the UL EU channel 110. The Node-B 104 includes a request priority queue 114 for queuing E-DCH allocation requests and a maximum time to allocate timer 116 for establishing an E-DCH allocation request response time period. The WTRU includes a channel allocation response timer 118 for generating periodic channel allocation requests when a channel allocation has not been received from the Node-B 104.

FIG. 2 is a flow diagram of a process 200 for reducing congestion in the UL EU channel 110 in accordance with one embodiment of the present invention. When the WTRU 102 has E-DCH data to transmit, the WTRU 102 sends an E-DCH allocation request to the Node-B 104 via the UL EU channel 110 (step 202). The signaling of the E-DCH allocation request may be either physical or medium access control (MAC) layer signaling.

Upon receiving the E-DCH allocation request from the WTRU 102, the Node-B 104 determines whether there are resources available for allocation of the E-DCH to the WTRU within a predetermined channel request response time period (step 204). The channel request response time period is a maximum time period within which the Node-B 104 should respond to the channel allocation request. The channel request response time period established by the maximum time to allocate timer 116 of the Node-B 104 is activated when the E-DCH allocation request is received by the Node-B 104. The channel request response time period may be a fixed value in the system or configured by the RNC 106 for each EU radio access bearer (RAB) and signaled to both the Node-B 104 and the WTRU 102.

If E-DCH resources are available, the Node-B 104 sends an acknowledgement message to the WTRU 102 indicating that the E-DCH allocation request has been received (step 206), and also sends scheduling information, (i.e., E-DCH allocation information), within the channel request response time period via the DL EU signaling channel 112 (step 207). The WTRU 102 then transmits data through the UL EU channel 110 in accordance with the scheduling information (step 208).

If the E-DCH resources cannot be allocated before the channel request response time period expires, the Node-B 104 sends an acknowledgement message to the WTRU 102 indicating that the E-DCH allocation request has been received, but does not send scheduling information to the WTRU 102 before the channel request response time period expires (step 210). The acknowledgement message does not include scheduling information, but merely confirms that the Node-B 104 has received the channel allocation request and will process the request when resources become available.

In accordance with one embodiment of the present invention, the E-DCH allocation request indicates a priority. After sending the acknowledgement message to the WTRU 102 confirming reception of the E-DCH allocation request, the E-DCH allocation request is stored in a request priority queue 114 in the Node-B 104 based on the indicated priority of the request (step 212). When the request is placed in the request priority queue 114, the maximum time to allocate timer 116 is activated or, equivalently, the time of reception of the E-DCH allocation request is recorded. The maximum time to allocate is a maximum time period within which the E-DCH allocation request should be served before the E-DCH allocation request is finally determined to have failed. The maximum time to allocate may be unique to each transmission that maps to a particular data flow or data priority class.

The requests within the request priority queue 114 in the Node-B 104 may be serviced on a first-in first-out (FIFO) basis. If there are not enough resources, the allocation is further delayed until it becomes available. If there are available resources, the Node-B 104 services at least one request in the request priority queue 114.

Upon receiving the acknowledgement message from the Node-B 104 in response to receiving the E-DCH allocation request, the WTRU 102 checks whether scheduling information was also received, or whether only the reception of the channel allocation request was acknowledged. If the scheduling information was received, the WTRU 102 transmits data through the UL EU channel 110 according to the scheduling information specified by the Node-B 104 (step 208). If only an acknowledgement of reception of the E-DCH allocation request was received, the WTRU 102 knows that the Node-B 104 has received the E-DCH allocation request and refrains from retransmitting the same request (step 214).

After the channel allocation request has been received and confirmed without scheduling information, the Node-B 104 may provide EU channel allocations later on for the WTRU 102 whose requests have been queued in the request priority queue 114 of the Node-B 104. Periodically, potentially each transmit time interval (TTI) at step 216, the Node-B 104 determines whether resources are available for allocation for the requests in the request priority queue 114 (step 218). If there are resources available, the process 200 proceeds to steps 207 and 208.

If there are no resources available, the Node-B 104 determines whether the maximum time to allocate timer 116 expired (step 220).

If the maximum time to allocate timer 116 did not expire, as determined at step 220, the process 200 waits for the next TTI at step 216. The Node-B 104 may prioritize allocations that are close to expiration of the maximum time to allocate.

After the maximum time to allocate timer 116 has expired or, equivalently, a predetermined time period elapses after the recorded request reception time, the WTRU 102 relies on its channel allocation response timer 118 for tracking the maximum allocate time period for each E-DCH allocation request. The WTRU 102 sets the channel allocation response timer 118 each time the WTRU 102 sends an E-DCH allocation request to the Node-B 104, and recognizes the allocation failure upon expiration of the channel allocation response timer 118. Alternatively, if the WTRU 102 does not maintain its own equivalent channel allocation response timer 118, the Node-B 104 notifies the WTRU 102 of the failure of allocation. If the WTRU 102 maintains its own channel allocation response timer 118, there is no need for the Node-B 104 to notify the WTRU 102 of the failure.

When the E-DCH allocation failure occurs, the WTRU 102 has several options. The WTRU 102 may retransmit the E-DCH allocation request or an updated request to the Node-B 104 (step 224). Step 224 may be performed on a periodic basis, each time the channel allocation response timer 118 expires. Alternatively, the WTRU 102 may discard the data for which it requested an allocation and send an updated E-DCH allocation request if the WTRU 102 has more E-DCH data to transmit (step 226).

Figure 3:
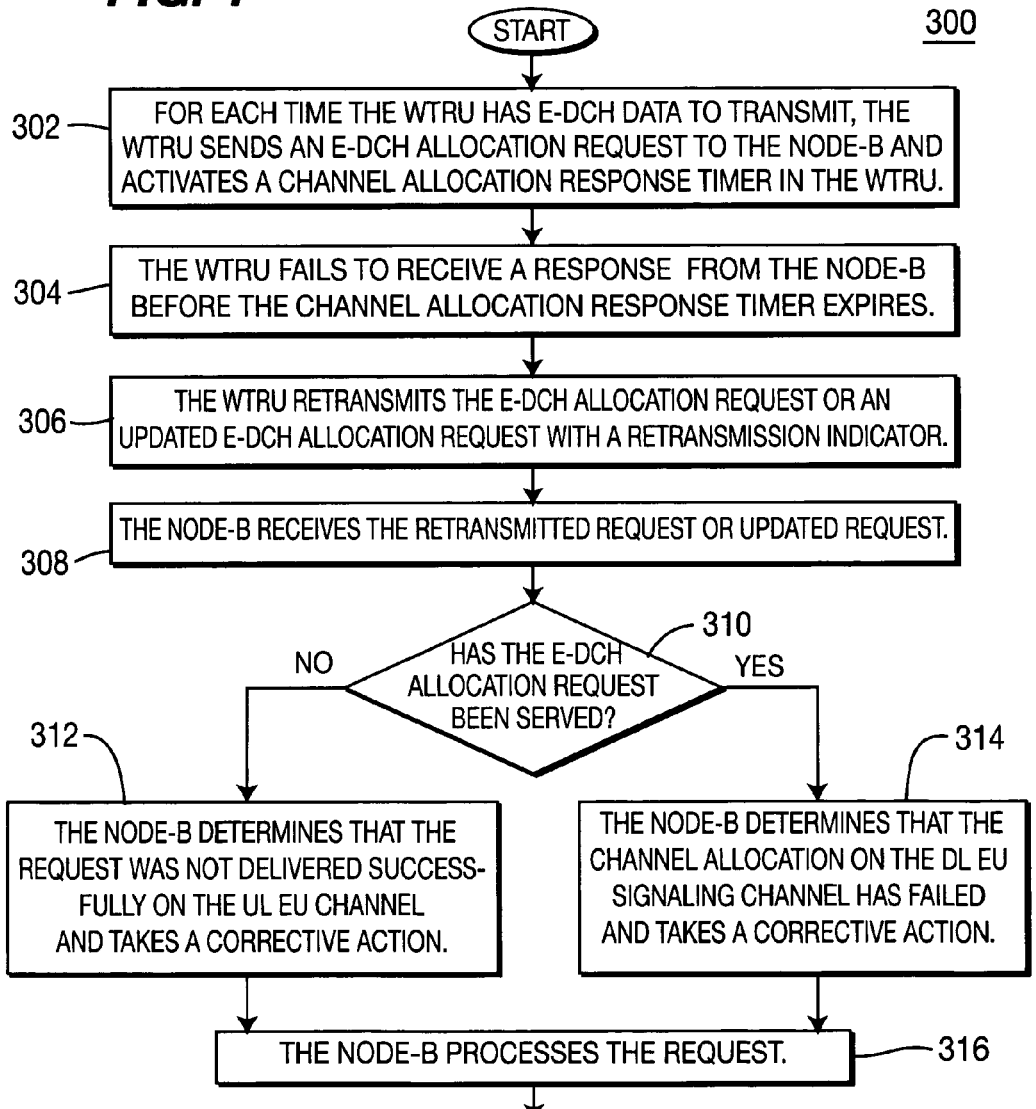
FIG. 3 is a flow diagram of a process for determining signaling channel failure during channel allocation and taking corrective actions in accordance with another embodiment of the present invention.

FIG. 3 is a flow diagram of a process 300 for determining signaling channel failure during channel allocation in accordance with another embodiment of the present invention. When the WTRU 102 has EU data to be transmitted, the WTRU 102 sends an E-DCH allocation request to the Node-B 104 and activates the channel allocation response timer 118 (step 302). After sending the E-DCH allocation request, the WTRU 102 waits to receive scheduling information, (i.e., E-DCH allocation information), from the Node-B 104 until the channel allocation response timer 118 expires. If the WTRU 102 fails to receive scheduling information from the Node-B 104 before the channel allocation response timer 118 expires (step 304), the WTRU 102 retransmits the same E-DCH allocation request with a retransmission indicator or an updated E-DCH allocation request (step 306).

In this case, the WTRU 102 does not know if either the UL EU signaling, (i.e., E-DCH allocation request), or the DL EU signaling, (i.e., channel allocation), is lost. If the Node-B 104 receives a retransmitted E-DCH allocation request (step 308), the Node-B 104 determines where the failure occurs, (i.e., either the E-DCH allocation request in the UL EU channel 110 or the channel allocation through the DL EU signaling channel 112). If the Node-B 104 receives a retransmitted E-DCH allocation request which was not served, the Node-B 104 determines that the E-DCH allocation request was not delivered successfully on the UL EU channel 110 (step 312). If the Node-B 104 receives a retransmitted E-DCH allocation request which was served, the Node-B 104 determines that the channel allocation information was not delivered successfully on the DL EU signaling channel 112 (step 314). For either of steps 312 and 314, the Node-B 104 then takes appropriate corrective actions in accordance with the determined failure. The Node-B 104 then processes the received request (step 316).

The present invention assures that E-DCH allocation requests have been received by the Node-B 104 and the EU UL signaling load is minimized when the E-DCH channel allocation is not immediately provided by the Node-B 104. Using the method of the present invention results in a more efficient use of UL physical resources.

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A method, implemented by a Node-B, of minimizing utilization of an uplink (UL) enhanced uplink (EU) channel while maintaining proper EU scheduling operation, the method comprising:
   the Node-B receiving an enhanced dedicated channel (E-DCH) allocation request over the UL EU channel;
   in response to receiving the E-DCH allocation request, the Node-B making a determination that E-DCH allocation cannot be provided before a predetermined time period expires;
   in response to the determination, the Node-B sending an acknowledgement message indicating that the E-DCH allocation request has been received, and storing the E-DCH allocation request in an allocation request priority queue of the Node-B;
   activating a timer set to the predetermined time period;
   determining whether there are resources available to allocate the stored E-DCH allocation request;
   recording the time at which the E-DCH allocation request is received; and
   transmitting a notification of a resource allocation failure in response to an expiration of the timer.

2. The method of claim 1 wherein the E-DCH allocation request indicates a priority of the request, and the E-DCH allocation request is stored in the allocation request priority queue based on the priority indicated by the E-DCH allocation request.

3. The method of claim 1 wherein the timer establishes a maximum time period within which the E-DCH allocation request is to be served before the E-DCH allocation request is determined to have failed.

4. A Node-B comprising:
   a timer configured to be activated for a predetermined time period;
   circuitry configured to determine whether enhanced dedicated channel (E-DCH) allocation can be provided within the predetermined time period in response to receiving an E-DCH allocation request;
   an allocation request priority queue configured to store the E-DCH allocation request;
   circuitry configured to transmit an acknowledgement message indicating that the E-DCH allocation request has been received;
   circuitry configured to determine whether there are resources available to allocate the stored E-DCH allocation request;
   circuitry configured to record the time at which the E-DCH allocation request is received; and
   circuitry configured to transmit a notification of a resource allocation failure in response to an expiration of the timer.

5. The Node-B of claim 4 wherein the E-DCH allocation request indicates a priority of the request, and the E-DCH request is stored in the allocation request priority queue based on the priority indicated by the E-DCH allocation request.

6. The Node B of claim 4 wherein the timer establishes a maximum time period within which the E-DCH allocation request is to be served before the E-DCH allocation request is determined to have failed.

* * * * *